United States Patent

Yagi

[11] Patent Number: 5,859,412
[45] Date of Patent: Jan. 12, 1999

[54] MICROWAVE AND FAR INFRARED DRYING UNDER REDUCED PRESSURE

[76] Inventor: Shunichi Yagi, 2-5-19 Shida, Fujieda-shi, Shizuoka-ken 426, Japan

[21] Appl. No.: 795,383

[22] Filed: Feb. 4, 1997

[30] Foreign Application Priority Data

Mar. 28, 1996 [JP] Japan .................................. 8-097310
Nov. 18, 1996 [JP] Japan .................................. 8-321194

[51] Int. Cl.⁶ .............................. H05B 6/68; H05B 6/80
[52] U.S. Cl. ..................... 219/704; 219/680; 219/686; 219/709; 219/751; 34/263; 34/259
[58] Field of Search ................................ 219/704, 705, 219/706, 709, 680, 681, 685, 686, 736, 737, 751; 34/263, 260, 259, 266, 268, 269

[56] References Cited

U.S. PATENT DOCUMENTS

| | | | |
|---|---|---|---|
| 2,859,534 | 11/1958 | Copson | 219/686 |
| 4,622,446 | 11/1986 | Sugisawa et al. | 34/263 |
| 4,856,201 | 8/1989 | Dokoupil et al. | 34/263 |
| 5,003,143 | 3/1991 | Marks et al. | 219/686 |
| 5,135,122 | 8/1992 | Gross et al. | 219/685 |
| 5,270,509 | 12/1993 | Gerling | 219/716 |
| 5,325,600 | 7/1994 | Gentile | 34/260 |
| 5,606,804 | 3/1997 | Smith et al. | 34/261 |

FOREIGN PATENT DOCUMENTS 2548090 8/1996 Japan .

*Primary Examiner*—Philip H. Leung
*Attorney, Agent, or Firm*—Hedman, Gibson & Costigan, P.C.

[57] ABSTRACT

A method of drying objects includes the steps of placing the object into a pressure reduction tank, placing a metallic element having an acute-angled portion into the pressure reduction tank, reducing to the pressure toward a predetermined single reduced pressure value or plurality of reduced pressure values, subjecting the object to controlled microwave heating and controlled far infrared heating either separately or simultaneously, continuously heating the body of the pressure reduction tank to vaporize any water that comes into contact with the inside wall surfaces of the pressure reduction tank, detecting an electrical discharge at the acute-angled portion of the metallic element due to microwave energy, stopping or pausing the microwave heating when an electrical discharge is detected at the acute-angled portion of the metallic element, continuously measuring the change in reduced pressure at prescribed time intervals after the microwave heating has been stopped or paused upon detecting an electrical discharge due to microwave energy, and terminating the drying process when the measured change in reduced pressure reaches a predetermined target reduced pressure change value determined in accordance with the level of dryness selected and the type of object being dried.

5 Claims, 4 Drawing Sheets

5,859,412

MICROWAVE AND FAR INFRARED DRYING UNDER REDUCED PRESSURE

BACKGROUND OF THE INVENTION

1. Field of the Invention

The present invention relates to a method of drying materials and an apparatus therefor for drying a wide variety of materials such as cut flowers including natural flowers and flowering plants, vegetables including leafy vegetables, tuberous vegetables, stalky vegetables and fruiting vegetables, leafy plants such as tobacco, seafoods, meats, laundry including medical laundry, industrial laundry and household laundry, and other materials such as wood and ceramic powder.

2. Description of the Prior Art

In prior art methods of drying flowers, cut flowers are placed inside a pressure reduction tank, and with the pressure reduced to a prescribed level, controlled microwave heating and controlled far infrared heating are carried out to dry the cut flowers.

Now, as for the drying of food, the freeze drying method has been mainly used. For example, instant cup ramen usually comes with clear packages containing thinly sliced green onion and the like which have been freeze dried.

Further, the drying of seafood is mostly carried out naturally or by a hot air drying method.

As for the drying of laundry which has undergone washing, it is usually placed into a drying chamber and subjected to hot air while the inside of the chamber is rotated.

Now, when carrying out these various drying methods, the drying time can be controlled by the use of a timer.

However, in the prior art method of drying flowers described above, when carrying out control of the drying process, a method of detecting the state of the object being dried is necessary in order to know when to stop or pause the microwave heating.

In this connection, such prior art methods do not enable sufficient control of the drying process in accordance with the type of object to be dried.

Further, the freeze drying method mainly used to dry vegetables involves the use of an expensive apparatus and is not very effective for drying thick vegetables. Furthermore, when vegetables such as green onions and the like which have a lot of flavor and aroma are dried in this way and then rehydrated in hot air, much of the flavor and aroma are lost.

Furthermore, when drying seafood with the natural method or the hot air method, it is possible for the seafood to decay due to oxidation as a result of the long time required for such drying. Consequently, these methods are not regarded as clean drying methods. Furthermore, these methods degrade the flavor and nutrient content.

Moreover, even though the hot air drying method is generally used in commercial dryers and laundromat dryers to dry laundry, this method takes too much time, generates static electricity, can not achieve adequate sterilization, shrinks cotton knits and causes damage to the cloth material due to the laundry striking the rotating drum.

Furthermore, the drying time for the drying methods described above are generally controlled with a timer set in accordance with a value determined by experiment. However, because the water content of a material can vary from one object to another, it is not possible to achieve an accurate water content level drying with such timed drying methods.

Furthermore, even in the "Method of Drying Flowers and Apparatus Therefor" of Japanese Patent No. 2,548,090 granted to the present inventor, it is possible for insufficient drying to occasionally occur due to an insufficient establishment of control technology in one part of such patent.

In particular, when the output of microwave energy is high, the rate at which water gets forced out of the objects being dried is too fast, and because the amount of heat energy being used is not sufficient to vaporize water drops that fall onto the inside surface of the pressure reduction tank, this creates a build up of water drops on the inside surfaces of the pressure reduction tank. In this case, even though the objects being dried have almost no water content left, no electric discharge occurs because the water drops on the inside of the pressure reduction tank continue to absorb microwave radiation. As a result, the transmission of microwave radiation continues, and this causes the objects being dried to become partially scorched.

Furthermore, in the case where far infrared heaters are arranged inside the pressure reduction tank, such arrangement must be carefully thought out to prevent the objects being dried from touching the far infrared heaters. Moreover, the pressure reduction tank must be made larger than is necessary in order to accommodate the far infrared heaters which require a relatively large amount of space.

SUMMARY OF THE INVENTION

With a view toward overcoming the problems of the prior art described above, it is an object of the present invention to provide a method of drying materials and an apparatus therefor which can be used to quickly dry various materials in a wide range of industrial fields at low production cost while achieving high productivity and high drying accuracy with virtually no loss of characteristics of the material being dried.

It is another object of the present invention to provide a method of drying materials and an apparatus therefor which makes it possible to instantly vaporize any water drops that land on the inside surface of the pressure reduction tank after being forced out of the objects being dried in order to prevent the objects from being scorched due to overheating with microwave energy, so as to increase the drying control accuracy for the objects being dried.

It is a further object of the present invention to provide a method of drying materials and an apparatus therefor which makes it possible to construct a compact-size pressure reduction tank by using an innovative arrangement for the far infrared heater used in the pressure reduction tank.

In order to accomplish the object stated above, in the method of drying objects according to the present invention, the objects to be dried are placed into a pressure reduction tank and the pressure is lowered and kept at either a single pressure level or varied between a plurality of pressure levels. In this state, the objects are then subjected to controlled microwave heating and controlled far infrared heating, either separately or simultaneously. Now, in order to control such microwave heating, a metallic element having an acute-angled portion is arranged inside the pressure reduction tank. Namely, when an electrical discharge due to such microwave energy is detected at the acute-angled portion of the metallic element, the drying process is controlled by either stopping or pausing the microwave heating.

Further, an apparatus for carrying out the drying method of the present invention can be constructed from a pressure reduction tank into which the objects to be dried are placed, a microwave heating device equipped with a control board arranged outside the pressure reduction tank to control intermittent or continuous microwave heating at either a prescribed or variable power level, a far infrared heating device equipped with a control board arranged outside the pressure reduction tank to regulate the temperature generated by such far infrared heating, a control portion to enable microwave heating and far infrared heating to be operated simultaneously, a metallic element having an acute-angled portion arranged inside the pressure reduction tank, and a device for detecting any electrical discharge that occurs at the acute-angled portion of the metallic element due to microwave energy.

Furthermore, the method of drying objects according to the present invention includes a method of controlling the level of dryness of the objects being dried. Namely, when an electrical discharge due to microwave energy is detected, the microwave heating is stopped, and then pressure changes inside the pressure reduction tank are continuously measured at prescribed intervals, whereby the drying process is terminated when such measured pressure changes reach a predetermined target reduced pressure change value in accordance with the type of object being dried.

Moreover, in the method of drying materials according to the present invention, after the objects to be dried are placed in pressure reduction tank, the objects are subjected to controlled microwave heating and controlled far infrared heating either separately or simultaneously while the body of the pressure reduction tank is continuously heated from the outside of the body of the pressure reduction tank. In this way, any water drops that fall onto the inside wall surfaces are instantly vaporized.

In this connection, the apparatus for carrying out the drying method of the present invention is equipped with a means for detecting the level of dryness of the objects being dried in the pressure reduction tank. One example of such a dryness level detection means is a controller equipped with a device which determines when the changes in reduced pressure inside the pressure reduction tank (which are continuously measured at prescribed intervals after the microwave heating has been stopped upon the detection of an electrical discharge due to microwave energy) reach a predetermined target reduced pressure change value.

Furthermore, in the apparatus for carrying out the drying method of the present invention, the inside walls of the pressure reduction tank are covered with a layer which includes a far infrared radiation emitting substance. In this way, when the pressure reduction tank is heated from the outside of the body of the pressure reduction tank, the body of the pressure reduction tank itself becomes a far infrared heater.

Now, when objects are to be dried in accordance with the drying method of the present invention, the objects are first placed into the pressure reduction tank and the pressure therein is reduced. Then heat energy generated by microwave radiation is used to vaporize the water contained in the objects at a temperature below the boiling point. In this regard, the amount of microwave radiation used to vaporize the water in the high water content portions of the objects, namely the inside portions of the objects, is greater than the amount of microwave radiation used to vaporize the water in the low water content portions of the objects, namely the outside portions of the objects. Further, such microwave heating can be selectively used to heat the portions which contain water in order to carry out effective drying. Accordingly, it is possible to control the drying process so that the portions of the objects which are mostly dried will receive very little heating while the portions that still contain water receive most of the heat energy.

Further, such microwave heating forces the water inside the objects being dried to migrate toward the outside surfaces thereof, but once this water reaches the outside surface it requires a very high caloric energy to be vaporized. However, if microwave heating alone is used to generate such a high caloric energy level, it becomes difficult to dry the objects without damaging them. To solve this problem, the drying method according to the present invention carries out controlled far infrared heating at the same time controlled microwave heating is carried out, and this makes it possible to quickly and effectively dry both the inside and the outside of the objects in a continuous manner.

Now, in the case where the water that is forced out of the objects being dried forms drops that fall onto the inside surfaces of the pressure reduction tank, such drops are instantly vaporized as they land on the inside surfaces of the pressure reduction tank due to the continuous heating from the outside of the body of the pressure reduction tank, and this prevents the object, from being scorched due to overheating by microwave energy. In this way, it is possible to vastly improve the drying control accuracy for the objects being dried.

Furthermore, by forming a layer which includes a far infrared emitting substance on the inside walls of the pressure reduction tank, it becomes possible to turn the body of the pressure reduction tank into a far infrared heater by heating the pressure reduction tank. In this way, the present invention makes it possible to construct a compact-size pressure reduction tank.

Further, in order to control the level of dryness of the objects being dried, a metallic element having an acute-angled portion is arranged inside the pressure reduction tank and a detection device for detecting the occurrence of an electrical discharge at the acute-angled portion of the metallic element due to microwave energy is provided, and this makes it possible to carry out extremely accurate control of the drying process. In this connection, if the objects being dried do not have an extremely sharp metal edge made from gold dust or the like, and no electrical discharge due to microwave energy will occur as long as the objects have a dielectric which is highly effective at absorbing microwave energy, namely a sufficient amount of water. In other words, an electrical discharge due to microwave energy will occur at the acute-angled portion of the metallic element when the water content of the objects being dried is reduced to a specific level.

In this connection, experiments confirmed that no electrical discharge due to microwave energy were observed when the objects being dried had a sufficient water content, even before and after passing through the reduced pressure range of 20 Torr–10 Torr where electrical discharges generally occur. Taking advantage of this fact in the method of drying objects according to the present invention, when an electrical discharge due to microwave energy is detected at the acute-angled portion of the metallic element provided in the pressure reduction tank, the microwave heating is terminated, and at the same time it is determined that the drying process is near completion. After this has taken place, it is possible to further carry out far infrared heating at reduced pressure to complete the drying process within a short amount of time.

Examples of methods used to detect such electrical discharge due to microwave energy include the use of ultraviolet light detectors or detectors which detect the sound of such electrical discharge. However, the present invention is in no way limited to the use of these types of detectors.

Further, after the microwave heating has been terminated, the completion of the drying process is controlled by the use of a digital controller which continuously measures the changes in reduced pressure inside the pressure reduction tank to determine when such changes in reduced pressure reach a predetermined target reduced pressure change value determined in accordance with the type of object being dried and the dryness level desired for such object. In this way, the drying process can be accurately controlled to obtain a specific dryness level.

The control of such dryness level can be better understood with reference to FIG. 3, in which $T_n$ indicates specific points in time and $A_n$ indicates the change in reduced pressure from time $T_n$ to time $T_{n+}$ with t being the amount of time between adjacent points in time (e.g., between $T_1$ and $T_2$). For example, at time $T_2$ the digital controller measures the value $A_1$ of the change in reduced pressure from the time $T_1$. In the example shown in FIG. 3, the pressure inside the pressure reduction tank is shown approaching the target reduced pressure value of 1.5 Torr, thus indicating that drying process is nearing its end. Namely, the value of $A_n$ gets smaller as the change in reduced pressure becomes less, which means that the amount of water being vaporized is becoming smaller, and this in turn means that the drying process is near completion. Accordingly, experiments can be used to define a target $A_n$ value in accordance with the type of object to be dried and the water content level desired, whereby the drying process can be terminated upon reaching the target $A_n$ value at time $T_{n+1}$. Examples of $A_n$ values determined by experiment are shown below.

Flower (0% water content): t=90 sec; $A_n$=0.1 Torr

Laundry (0% water content): t=60 sec; $A_n$=0.1 Torr

Coarse Tea (5% water content): t=60 sec; $A_n$=0.5 Torr

Baby Scallops (3% water content): t=90 sec; $A_n$=0.5 Torr

Fresh Tea Leaves (0% water content): t=70 sec; $A_n$=0.1 Torr

In this connection, it is to be noted that because different microwave outputs, far infrared heating levels and reduced pressure levels were used for each of the objects listed above, the values of t and $A_n$ are in no way limited to the values shown above.

Thus, the method of drying objects according to the present invention makes it possible to accurately dry a wide variety of objects to any desired dryness level.

Furthermore, because the microwave heating is highly effective at carrying out sterilization, the objects dried by the method according to the present invention are extremely clean and sterile.

Further, in order to control the dryness level of the object being dried, the change in reduced pressure $A_n$ is divided by the prescribed time interval t, namely the value of $A_n/(T_{n+1}-T_n)$ is calculated, and when this calculated value reaches a predetermined target reduced pressure change value determined by experiment in accordance with the type of object being dried, the drying process is terminated.

DETAILED DESCRIPTION OF THE PREFERRED EMBODIMENTS

Figure 1:
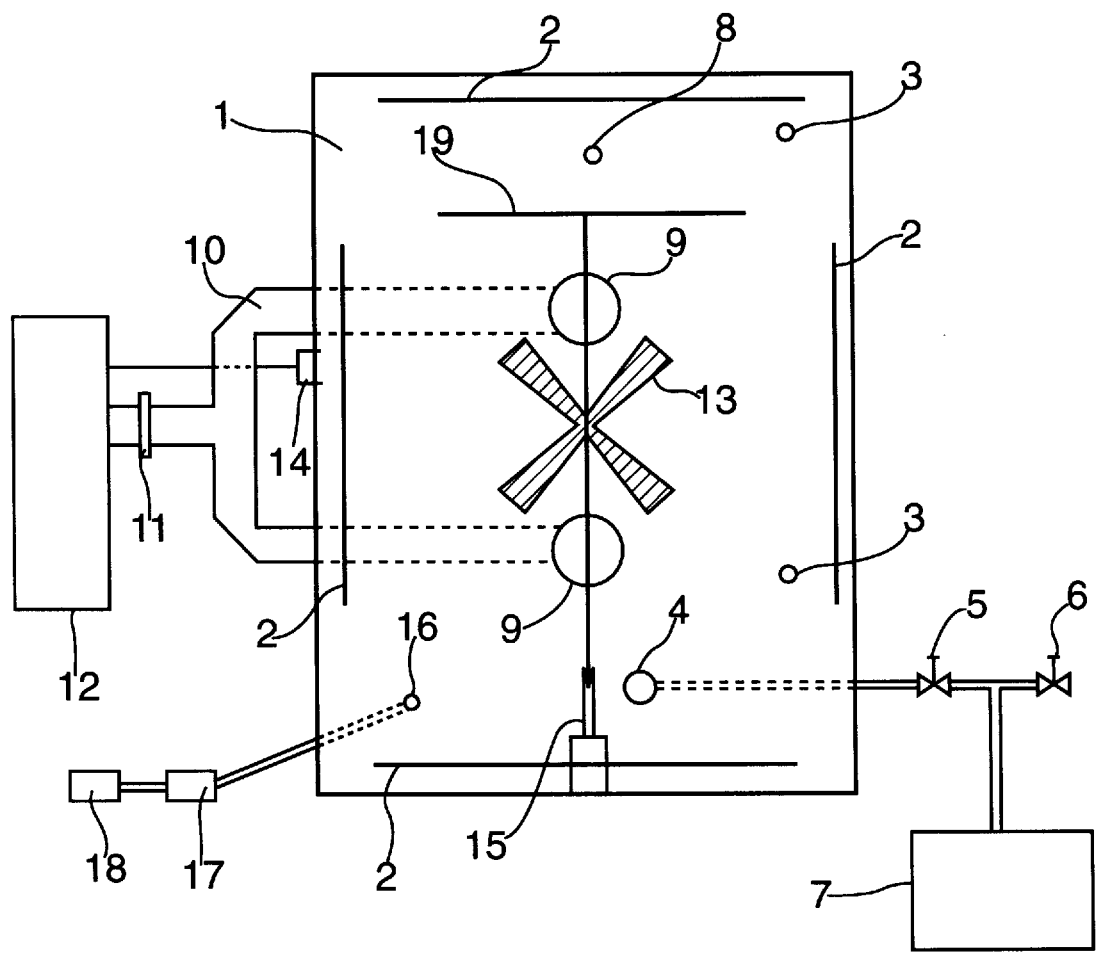
FIG. 1 is an outline diagram showing one embodiment of an apparatus for carrying out the drying method of the present invention.

First, a description of the elements of the experimental device shown in FIG. 1 will be given.

Namely, a stainless steel pressure reduction tank 1 having a length of 1200 mm, a width of 900 mm and a depth of 1050 mm is used. Provided on both the ceiling and floor surfaces of the inside of the pressure reduction tank 1 are two far infrared heaters 2 having an output of 650 W, with one far infrared heater 2 having the same output being provided on the left and right side surfaces shown in FIG. 1 for a total of six far infrared heaters 2. These far infrared heaters 2 are arranged together with reflection plates (not shown in the drawing). Further, a microwave power unit 12 having an output of 5 KW is provided and is linked with an electrical discharge detection device 14 which uses an ultraviolet light detection device. Also provided is a reduced pressure meter 17 which displays pressure in units of 1/10 Torr. Further provided is a vacuum pump 7 having an output of 5.5 KW which is used to reduce the pressure inside the pressure reduction tank 1 to a maximum reduced pressure of 1.5 Torr. And as shown in the middle of the drawing, a leak valve 8 is provided.

Further, thermocouples 3 are provided inside the pressure reduction tank 1 near the far infrared heaters 2 at distances which correspond to the closest distance from the far infrared heaters 2 to the objects set on the object support jig 19.

The end portions of the thermocouples 3 are provided with aluminum having a black-colored coating which has a high far infrared absorptivity. In this way, such end portions of the thermocouples 3 function as heat sensors, and by connecting the thermocouples 3 to a temperature regulator (not shown in the drawing), it becomes possible to control the temperature at such end portions to have a maximum temperature of 90° C. In this connection, experiments confirmed that the amount of far infrared radiation absorbed by objects such as fresh vegetables and seafood at a prescribed irradiation distance from the far infrared heaters 2 in this embodiment is approximately 60–70% of that absorbed by the black-colored aluminum provided on the end portions of the thermocouples 3, and this makes it possible to control the temperature in order to prevent the fresh vegetables and seafood from being damaged by excessive heat. At this point it is to be noted that the present invention is not limited to the temperature control means and method described in the present embodiment, and it is possible to utilize various temperature control means and methods with the present invention.

Further, the heat sensor portions at the ends of the thermocouples 3 and the wiring thereof are covered by a protective box (not shown in the drawing) and a protective tube (not shown in the drawing) in order to protect such elements from the effects of microwave radiation.

Now, for controlling the pressure inside the pressure reduction tank 1, a vacuum pump 7 is arranged outside the pressure reduction tank 1 and is connected to a pressure reduction valve 5 and a pressure reduction regulator valve 6, with the pressure reduction valve 5 communicating with a pressure reduction port 4 of the pressure reduction tank 1. In the present embodiment, this pressure reducing arrangement is used to lower the pressure inside the pressure reduction tank 1 toward 1.5 Torr. At this point it is to be noted that the present invention is not limited to the pressure reduction arrangement described in the present embodiment, and it is possible to utilize various pressure reducing systems and methods with the present invention. In this connection, a reduced pressure detection port 16 is provided as shown in the middle of the drawing.

To introduce microwave radiation into the pressure reduction tank 1, a microwave power unit 12, an isolator 11 and a forking waveguide 10 are arranged outside the pressure reduction tank 1, with the forking waveguide 10 communicating with microwave introduction ports 9 provided at two locations within the pressure reduction tank 1. Further, to create an even heating of the object set on the object support jig 19, a stirrer 13 which is a metallic element having acute-angled portions is provided and the object support jig 19 is connected to a rotation axle 15 to enable the object support jig 19 to be rotated.

Figure 4:
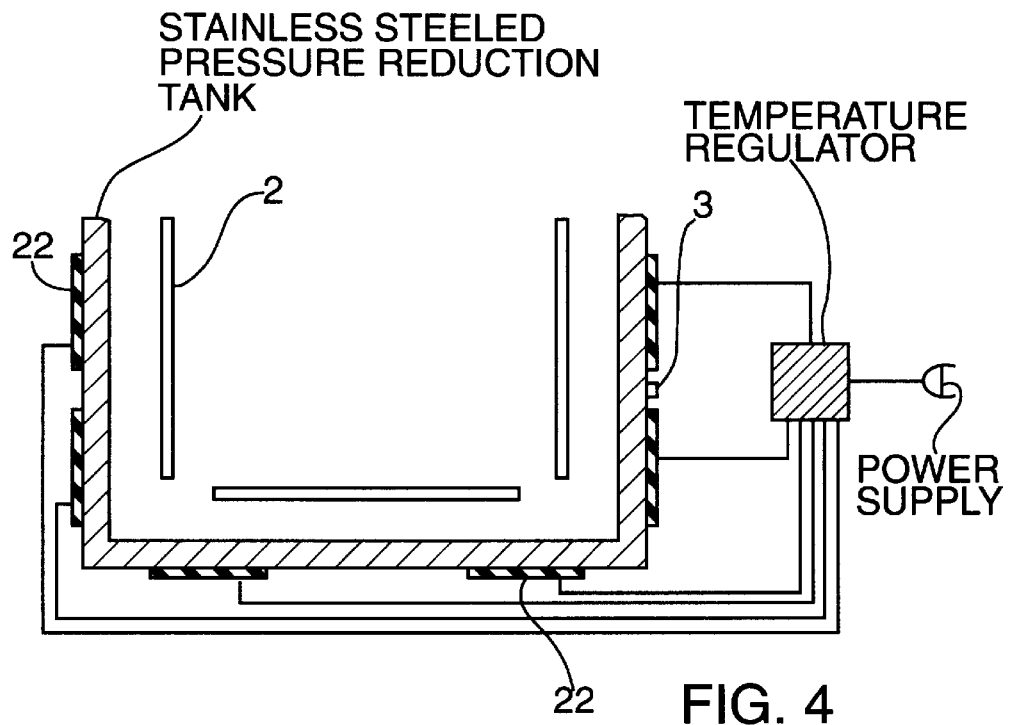
FIG. 4 is a cross-sectional view showing one structure of the walls of the pressure reduction tank.

Further, as shown in FIG. 4, with the far infrared heaters 2 arranged inside the stainless steel pressure reduction tank 1 as shown in FIG. 1, a silicon rubber heater 22 is provided on the outside surface of the pressure reduction tank 1 to be maintained at the vaporization temperature of water in a vacuum, namely a temperature that is normally about 60° C. In this way, when water is forced out of the objects being dried due to microwave heating, if this water forms drops that fall onto the inside surfaces of the pressure reduction tank 1, such water drops will be instantly vaporized. As a result, it becomes possible to prevent the objects from being scorched due to overheating with microwave energy. In other words, by quickly and continuously vaporizing water drops and expelling such vapor with the vacuum pump 7, it becomes possible to stop the microwave heating when the objects being dried have reached a desired level of dryness, whereby it becomes possible to prevent the objects from being scorched due to being overheated. Further, because this arrangement eliminates the excessive use of microwave radiation to heat drops that land on excessive use of microwave radiation to heat water drops that land on the inside surfaces of the pressure reduction tank 1, it becomes possible to vastly improve the drying control accuracy for the objects being dried. This in turn makes it possible to reduce the overall drying process time by about 30%.

Figure 5:
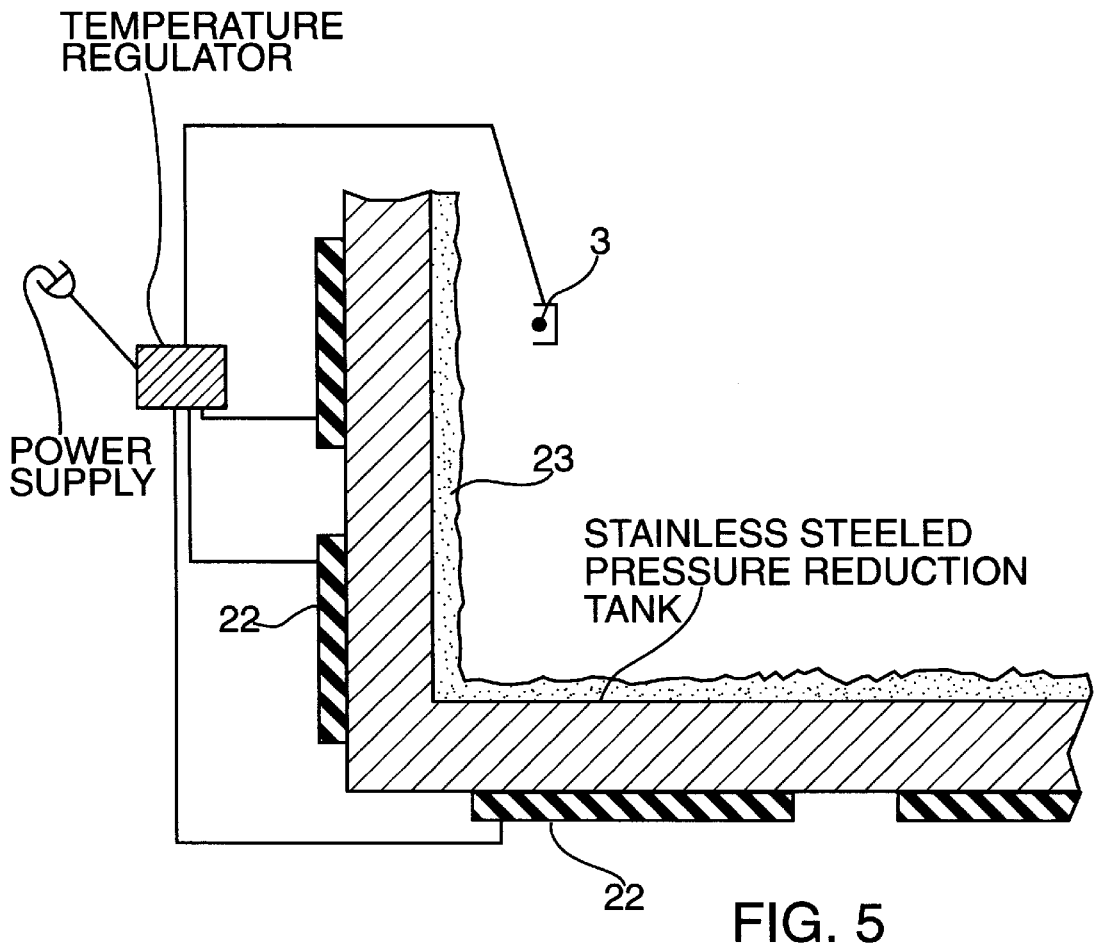
FIG. 5 is a cross-sectional view showing a second structure of the walls of the pressure reduction tank.

Further, as shown in FIG. 5, in place of the far infrared heaters 2 arranged inside the stainless steel tank 1, it is possible to fuse or apply a far infrared radiation emitted layer 23 directly onto the inside surfaces of the pressure reduction tank 1, such as the ceiling, side walls and bottom surface thereof, with a silicon rubber heater 22 being provided on roughy 60% of the outside surface of the pressure reduction tank 1. For emitting far infrared radiation, the far infrared radiation emitting layer 23 includes a heat resistant metal or metallic oxide such as $MnO_2$, $Fe_2O_3$, $Cr_2O_3$, CuO, $TiO_2$ or a combination thereof which is fused onto the inside surfaces of the pressure reduction tank 1, with a heat-resisting material being applied over the surface of such fused layer. The temperature is regulated to maintain a heating temperature of 60° C. at the objects being dried by the operation of far infrared heating thermocouples 3 arranged on the inside surface of the pressured reduction tank 1. With this arrangement, it is possible to reduce the dimensions of the pressure reduction tank 1 from a length of 1200 mm, a width of 900 mm and a depth of 1050 mm to a length of 1000 mm, a width of 700 mm and a depth of 850 mm. In other words, it is possible to reduce the dimensions of the pressure reduction tank 1 by approximately 47.5%, and this makes it possible to construct a drying apparatus which has a size suitable for home use.

SPECIFIC EXAMPLE 1

DRYING FLOWERS

Figure 2A:
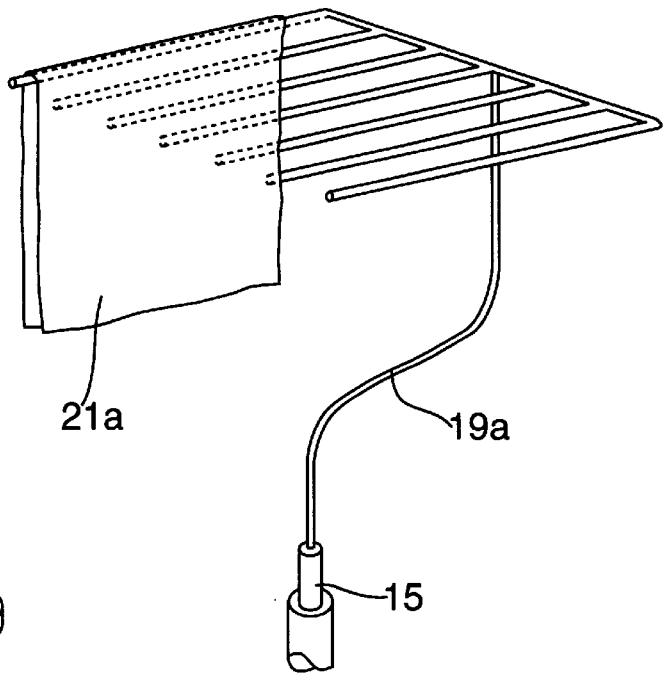
FIG. 2(a) is an outline perspective view of a support jig for holding laundry.

As shown in FIG. 2(*a*), a support jig 19*c* was used to support 200 roses 21*c* for drying. Namely, with the far infrared heaters 2 in an on state, the reduction of pressure inside the pressure reduction tank 1 was begun while at the same time a microwave heating at an output of 5 KW was begun. Nineteen minutes later the microwave heating was stopped upon detecting microwave discharge. Then, the reduction of pressure and far infrared heating were continued. In this connection, in order to control the completion of drying, the values of t and $A_n$ shown in FIG. 3 were set at 90 seconds and 0.1 Torr, respectively. In this regard, 25 minutes had elapsed when a digital counter 18 detected that $A_n$ had reached a final value of 0.1 Torr. Further, 100% drying was confirmed by finding that there was no difference between the weight of the roses 21*c* measured 27 minutes after the door to the pressure reduction tank 1 was opened and the weight of the roses after they were subjected to another 15 minutes of just reduced pressure and far infrared heating. Moreover, complete drying took 27 minutes and produced dry flowers having vivid color, splendid petal integrity and strong stems.

However, it is difficult to achieve 100% drying when carrying out one continuous microwave heating on plants such as the Prairie Gentian which has a globular embryo bud on the inside. In this case, after an electrical discharge occurs for microwave heating at 5 KW, the pressure reduction regulator valve 6 is used to set the pressure inside the pressure reduction tank 1 to a low pressure value (e.g., 35 Torr), and then a weak 1 KW microwave heating is carried out.

Now, except for the numerical values used for t and $A_n$, the operational method in the specific embodiment below is the same as the operation method used in the case of drying roses.

SPECIFIC EXAMPLE 2

DRYING LAUNDRY

As shown in FIG. 1(*a*), a support jig 19*a* was used to support 4.5 Kg of laundry 21*a* that had undergone water extraction in a commercially available water extractor before being placed on the support jig 19*a*. The laundry 21*a* was comprised of a mixture of clothes including a bath towel, a jersey, running underwear, jeans, socks and work clothes made of synthetics. In this case the value of t was set at 60 seconds and the value of $A_n$ was set at 0.1 Torr. The total drying time was 21 minutes (with the completion of drying being detected at 19 minutes). At the end of this time, each item of the laundry 21*a* was completely dried, and there was no problem with laundry items that included fasteners. The completion of drying was confirmed by touch. Furthermore, the method of the present invention proved to be remarkably superior to prior art methods. For example, when 4.5 Kg of laundry which had undergone water extraction was dried in a commercially available drum-type dryer, it took 140–145 minutes to achieve complete drying. In contrast with this, the method according to the present invention only takes 21 minutes to completely dry the same amount of laundry. Furthermore, when drying laundry in such a drum-type dryer, the collision of the laundry against the drum not only creates static electricity and lint, but damages fabric as well. However, none of these problems occur in the method according to the present invention. Furthermore, the incomplete drying of thick fabric items such as jeans, which frequently occurs in drum-type dryers, does not occur in the method according to the present invention. Moreover, the shrinking of cotton knits such as underwear which occurs with such drum-type dryers does not occur with the method according to the present invention. Furthermore, because the high level of microwave radiation used in the present invention carries out sterilization, the method according to the present invention makes it possible to achieve extremely clean and sterile dried laundry.

SPECIFIC EXAMPLE 3

DRYING COARSE TEA

Figure 2B:
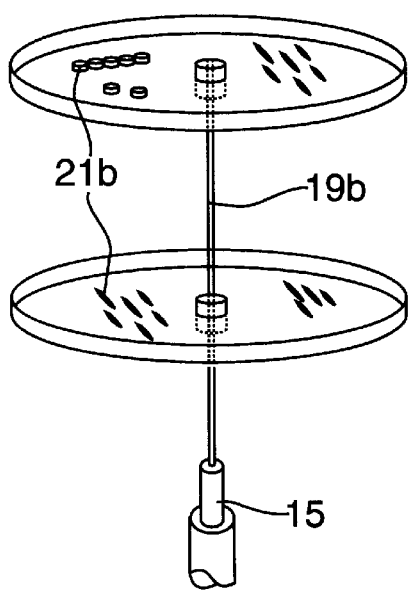
FIG. 2(b) is an outline perspective view of a support jig for holding cut pieces of green onion or baby scallops.
Figure 3:
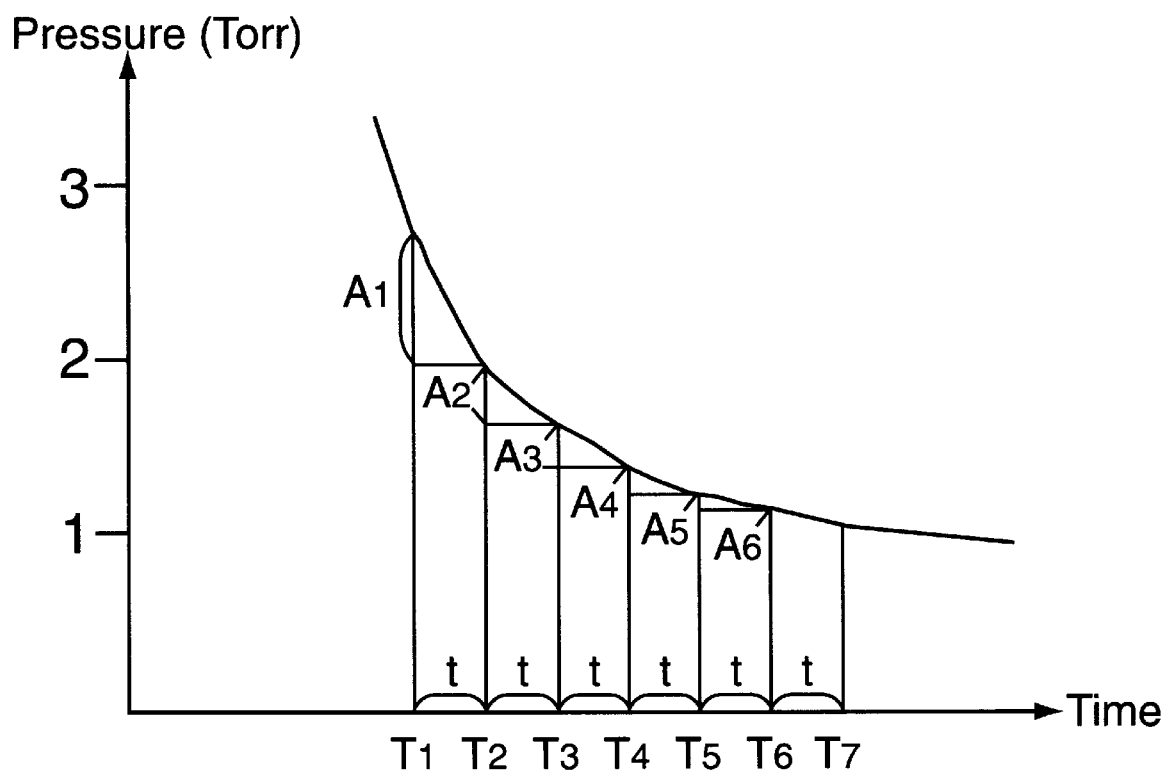
FIG. 3 is a diagram showing the relationship between elapsed time and the reduced pressure value when carrying out control of the drying process of the drying method of the present invention.

The support jig 19b shown in FIG. 2(b) was used for drying 4 Kg of coarse tea 21b having a water content of 13% which had undergone a mechanical grinding process. In this case the value of t was set at 60 seconds and the value of $A_n$ was set at 0.5 Torr, with a final water content of approximately 5% being the goal of such drying. In this regard, the total drying time was 7 minutes (with complete drying being detected at 5 minutes). The target water content was then confirmed by comparing the weight of a sample of such dried tea with a same-volume sample of completely dried tea. The results of several comparisons yielded a water content value of 5% with a ±0.12% margin of error. Furthermore, the color and aroma of the coarse tea 21b was extremely well preserved.

SPECIFIC EXAMPLE 4

DRYING FRESH BABY SCALLOPS

The support jig 19b shown in FIG. 2(b) was used for drying 2 Kg of baby scallops. Now, in order for the finished dried product to be in a ready to eat form, the target water content was set at approximately 3%. In this case the value of t was set at 90 seconds and the value of $A_n$ was set at 0.5 Torr. In this regard, the total drying time was 21 minutes (with complete drying being detected at 19 minutes). The target water content was then confirmed by the same method described in Specific Example 3 above. In this connection, because the baby scallops are only heated at 60° C., the flavor was extremely well preserved without loss of nutrients. Furthermore, when the dried baby scallops were stored together with a deoxidizing agent, there was no noticeable change even after six months.

Moreover, in the case where the baby scallops were dried to the point of having a water content of 0%, it was shown that they could be turned into powder for use as a highly flavorful soup ingredient.

SPECIFIC EXAMPLE 5

DRYING FRESH TEA LEAVES

The support jig 19b shown in FIG. 2(b) was used for drying 2 Kg of fresh tea leaves to the point where the water content became 0%. In this case the value of t was set at 70 seconds and the value of $A_n$ was set at 0.1 Torr. In this regard, the total drying time was 23 minutes (with complete drying being detected at 21 minutes). The dried tea was then crushed by hand and used to make a tea which was determined by taste test to have excellent flavor and aroma comparable to the first tea of the season.

SPECIFIC EXAMPLE 6

DRYING SLICED YAM

Figure 2C:
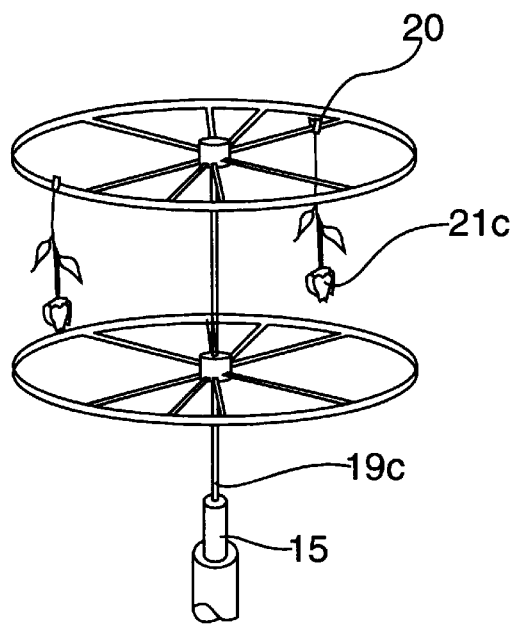
FIG. 2(c) is an outline perspective view of a support jig for holding sliced fish or sliced yam.

The support jig 19c shown in FIG. 2(c) was used dry 400 slices of yam 17a measuring 30 mm in width, 150 mm in length and 5 mm–7 mm in thickness. These slices of yam 17a were fixed to the support jig 19c by the use of clips 20 shaped like clothes clips, and then the support jig 19c was placed into the pressure reduction tank 1 to carry out drying. For control, the far infrared heat process is carried out continuously using an aforesaid heat control, and the microwave heat process is carried out continuously at a prescribed power level. The microwave heating process can be carried out, for example, intermittently at a prescribed power level, and intermittently at variable power levels or continuously at a prescribed power level, so it is possible to employ various heating methods. The present invention is no way limited to this methods of heating. As for drying time in the present embodiment, it took 20–30 minutes to completely dry 400 slices of yam 17a. A complete drying was comfirmed by freely selecting slices of yam and placing them back into the pressure reduction tank 1 to be subjected to another 20 minutes of just infrared heating, after which the dried yam slices were weighed and confirmed to have the same weight they had at the time the main drying was completed.

Furthermore, the method of this specific embodiment can be used to dry thick vegetables such as cabbage, radish, egg plants and cucumber which were difficult to dry with prior art methods, and this can be carried out with various kinds of fresh vegetables with virtually no loss of color or nutrient content.

In particular, when drying thick vegetables, such vegetables are first subjected to a prescribed process at a target reduced pressure of 2 Torr, after which the microwave heating again at a low power level while at a second target reduced pressure of 40 Torr.

As described above, when drying is carried out in accordance with the drying method of the present invention, the objects to be dried is placed inside a pressure reduction tank and subjected to controlled microwave heating and controlled far infrared heating either separately or simultaneously while the pressure inside the pressure reduction tank is reduced toward a single target reduced pressure level or plurality of target reduced pressure levels. Then, when an electrical discharge due to microwave energy is detected at an acute-angled portion of a metallic element arranged inside the pressure reduction tank, the microwave heating is stopped or paused to control the drying process. In this way, the drying method according to the present invention makes it possible to quickly dry various materials at low production costs while achieving high productivity and high drying accuracy with virtually no loss of characteristics of the object being dried.

Further, an apparatus for carrying out the drying method of the present invention can be constructed from a pressure reduction tank into which the objects to be dried are placed, a microwave heating device equipped with a control board arranged outside the pressure reduction tank to control intermittent or continuous microwave heating at either a prescribed or variable power level, a far infrared heating device equipped with a control board arranged outside the pressure reduction tank to regulate the temperature generated by such far infrared heating, a control portion to enable microwave heating and far infrared heating to be operated simultaneously, a metallic element having an acute-angled portion arranged inside the pressure reduction tank, and a device for detecting any electrical discharge that occurs at the acute-angled portion of the metallic element due to microwave energy. In this way, the present invention makes it possible to construct an apparatus that can accurately dry a wide variety of materials.

Moreover, in contrast with the expensive prior art freeze drying method used to dry vegetables, the present invention makes it possible to easily dry even thick vegetables with a relatively inexpensive apparatus. Furthermore, when vegetables are dried with the drying method according to the present invention, it is possible to preserve the aroma of aromatic vegetables such as green onions when they are rehydrated in hot water. Accordingly, the drying method of the present invention makes it possible to quickly dry fresh vegetables with virtually no loss of color or nutrient content. Namely, the water inside the fresh vegetables which is brought to the outside portion thereof by microwave heating is quickly vaporized by far infrared heating.

Moreover, in contrast with the time-consuming natural drying method or the hot air drying method used in the prior art to dry seafood, the drying method of the present invention makes it possible to quickly obtain cleanly dried seafood without the occurrence of decay due to oxidation. Further, seafood dried in accordance with the drying method of the present invention will retain virtually all its flavor and nutrient content.

Furthermore, in contrast with the prior art hot air drying methods used in commercial dryers and laundromat dryers to dry laundry, the drying method of the present invention makes it possible to quickly dry laundry without the generation of static electricity, the shrinkage of cotton knits and the damage due to collisions that occur with such prior art drying methods. Furthermore, the drying method of the present invention makes it possible to obtain a very high degree of sterilization when drying laundry.

Furthermore, in the drying method of the present invention, after the microwave heating has been stopped upon detecting an electrical discharge due to microwave energy, the change in reduced pressure inside the tank is continuously measured at prescribed intervals, with the drying process being terminated when such measured value reaches a predetermined reduced pressure change value determined in accordance with the type of object being dried and the dryness level desired. In this way, the drying method of the present invention can be easily adjusted to obtain a desired dryness level for a wide variety of objects.

Moreover, because the apparatus for carrying out the drying method of the present invention is provided with a controller equipped with a device for determining when the change in reduced pressure (after the microwave heating has been stopped upon the detection of an electrical discharge due to microwave energy) reaches a predetermined target reduced pressure change value, the present invention also makes it possible to construct a drying apparatus to quickly and easily obtain a desired dryness level with a wide variety of materials in many industrial fields with virtually no loss of the materials characteristics.

Furthermore, because the body of the pressure reduction tank is continuously heated, any water drops that fall onto the inside surfaces of the pressure reduction tank are instantly vaporized, and this makes it possible to prevent the object being dried from being scorched due to overheating with microwave radiation. In this way, the present invention provides a method of drying materials and an apparatus therefor which vastly improve the drying control accuracy for the object being dried.

Moreover, by providing a far infrared radiation emitting layer on the inside surfaces of the pressure reduction tank, the body of the pressure reduction tank forms an infrared heater when the pressure reduction tank is heated. In this way, the present invention provides a method of drying materials and an apparatus therefor which makes it possible to vastly reduce the dimensions of the pressure reduction tank, whereby it becomes possible to construct a compact-size pressure reduction tank.

What is claimed is:

1. A method for drying objects, comprising the steps of: placing the objects into a pressure reduction tank; placing a metallic element having a single or plural number of acute angled portions into said pressure reduction tank; subjecting the object to controlled microwave heating and controlled far infrared heating either separately or simultaneously;

making an electrical discharge occur at said metallic element having a single or plural number of angled portions due to microwave energy; and stopping or pausing the microwave heating when an electrical discharge is detected by an electrical discharge detection device.

2. The method of claim 1, further comprising a method of controlling the dryness level of the objects being dried, including the steps of:

continuously measuring the change in reduced pressure at prescribed time intervals after the microwave heating has been stopped or paused upon detecting an electrical discharge due to microwave energy; and terminating the dryness process when the measured change in reduced pressure reaches a predetermined target reduced pressure change value determined in accordance with a selected level of dryness and the type of the objects being dried.

3. An apparatus for drying objects, comprising:

a pressure reduction tank into which the objects to be dried are placed;

a microwave heating device equipped with a control board arranged outside the pressure reduction tank, to control intermittent or continuous microwave heating at either a prescribed or variable power level; the microwave heating device arranged outside the pressure reduction tank, with forking waveguide to introduce microwave energy into the pressure reduction tank;

a far infrared heating device equipped with a control board arranged outside the pressure reduction tank to regulate the temperature generated by such infrared heating; the far infrared heating device equipped with far infrared heaters arranged inside the pressure reduction tank;

a metallic element having a single or plural number of acute angled portions arranged inside the pressure reduction tank; the metallic element located where an electrical discharge can be detected except where a metallic element disturbs the objects to be dried; the metallic element making an electrical discharge occur due to microwave energy;

a device for detecting an electrical discharge that occurs at the metallic element due to microwave energy; and the device for detecting an electrical discharge is linked with a microwave power unit to stop or pause the microwave heating.

4. The apparatus of claim 3, further comprising a controller which includes a device for continuously measuring the change in reduced pressure inside the pressure reduction tank at prescribed time intervals after microwave heating is stopped or paused upon an electrical discharge being detected by the electrical discharge detecting device, with the controller being adapted to terminate the drying process when the measured change in reduced pressure reaches a predetermined target reduced pressure change value.

5. The apparatus of claim 3, wherein additional heaters are arranged onto the outside surface of the pressure reduction tank for vaporizing the water drops instantly on the inside of the pressure reduction tank.

* * * * *